United States Patent (10) Patent No.: US 12,180,782 B2
Vianello et al. (45) Date of Patent: Dec. 31, 2024

(54) DEVICE AND PROCEDURE FOR EXTRUSION AND APPLICATION OF SPACER PROFILE OF AN INSULATING GLASS

(71) Applicant: FOREL S.P.A., Treviso (IT)

(72) Inventors: Fortunato Vianello, Treviso (IT); Riccardo Vianello, Treviso (IT); Dino Moschini, Treviso (IT)

(73) Assignee: FOREL S.P.A., Treviso (IT)

( * ) Notice: Subject to any disclaimer, the term of this patent is extended or adjusted under 35 U.S.C. 154(b) by 400 days.

(21) Appl. No.: 17/639,656

(22) PCT Filed: Sep. 11, 2020

(86) PCT No.: PCT/IB2020/058467
§ 371 (c)(1),
(2) Date: Mar. 2, 2022

(87) PCT Pub. No.: WO2021/048811
PCT Pub. Date: Mar. 18, 2021

(65) Prior Publication Data
US 2022/0290491 A1 Sep. 15, 2022

(30) Foreign Application Priority Data

Sep. 13, 2019 (IT) .................. 102019000016250

(51) Int. Cl.
*E06B 3/67* (2006.01)
*B29C 48/15* (2019.01)
(Continued)

(52) U.S. Cl.
CPC .......... *E06B 3/6733* (2013.01); *B29C 48/155* (2019.02); *B29C 48/252* (2019.02);
(Continued)

(58) Field of Classification Search
CPC ......... E06B 3/6733; B29C 2948/92571; B29C 2948/92857; B29C 2948/92076; B29C 48/252; B29C 48/155
See application file for complete search history.

(56) References Cited

U.S. PATENT DOCUMENTS 5,045,146 A    10/1991  Rundo
5,173,148 A  * 12/1992  Lisec ................... B65G 49/061
                                                          269/21
(Continued)

FOREIGN PATENT DOCUMENTS

AT        399497 B  *  4/1995  ........... B05C 5/0216
DE      8600068 U1     2/1986
(Continued)

OTHER PUBLICATIONS

International Search Report for corresponding application PCT/IB2020/058467 filed Sep. 11, 2020; Mail date Dec. 18, 2020.
(Continued)

*Primary Examiner* — Robert B Davis
(74) *Attorney, Agent, or Firm* — CANTOR COLBURN LLP

(57) ABSTRACT

The present relates to a device and a procedure for the extrusion and application of a spacer profile of insulating glass, particularly for a machine adapted to compose the spacer frame directly against one or more glass panes constituting the insulating glass starting from a thermoplastic product prevalently contained in drums, displacing the extrados thereof to an adjustable and controlled distance referred to the margin of one or more glass panes.

12 Claims, 13 Drawing Sheets

(51) Int. Cl.
  *B29C 48/155* (2019.01)
  *B29C 48/25* (2019.01)
  *B29C 48/92* (2019.01)
  *E06B 3/663* (2006.01)
  *E06B 3/673* (2006.01)
  *B29K 105/04* (2006.01)
  *B29K 709/08* (2006.01)
  *B29L 31/00* (2006.01)

(52) U.S. Cl.
  CPC .......... *B29C 48/92* (2019.02); *E06B 3/66328* (2013.01); *B29C 2948/92076* (2019.02); *B29C 2948/92352* (2019.02); *B29C 2948/92571* (2019.02); *B29C 2948/92857* (2019.02); *B29K 2105/04* (2013.01); *B29K 2709/08* (2013.01); *B29K 2995/0015* (2013.01); *B29L 2031/001* (2013.01)

(56) References Cited

U.S. PATENT DOCUMENTS

| | | | | |
|---|---|---|---|---|
| 5,985,069 A * | 11/1999 | Kawabe | ............... | G02F 1/1339 |
| | | | | 428/34 |
| 6,660,091 B2 * | 12/2003 | Ito | ..................... | B05C 11/1039 |
| | | | | 118/712 |
| 7,922,842 B2 * | 4/2011 | Vianello | ............. | E06B 3/67343 |
| | | | | 156/107 |
| 2004/0118001 A1 * | 6/2004 | Turpin | .................... | G01C 9/26 |
| | | | | 33/760 |
| 2006/0151089 A1 * | 7/2006 | Kawamori | ............. | B29C 48/08 |
| | | | | 156/575 |
| 2012/0138212 A1 * | 6/2012 | Toriumi | ................ | B29C 48/155 |
| | | | | 156/500 |
| 2012/0180936 A1 * | 7/2012 | Schuler | .................. | B29C 48/07 |
| | | | | 156/578 |
| 2014/0041583 A1 | 2/2014 | Donohue | | |
| 2014/0110044 A1 * | 4/2014 | Okamoto | ............... | B29C 48/12 |
| | | | | 156/500 |
| 2021/0332637 A1 * | 10/2021 | Vianello | ............. | E06B 3/67391 |
| 2021/0381304 A1 * | 12/2021 | Krisko | .................. | E06B 3/6612 |

FOREIGN PATENT DOCUMENTS

| | | | | |
|---|---|---|---|---|
| DE | 10027043 A1 * | 12/2001 | .......... | B05C 5/0216 |
| DE | 102011011549 A1 | 8/2012 | | |

OTHER PUBLICATIONS

Written Opinion of the International Searching Authority for corresponding application PCT/IB2020/058467 filed Sep. 11, 2020; Mail date Dec. 18, 2020.

* cited by examiner

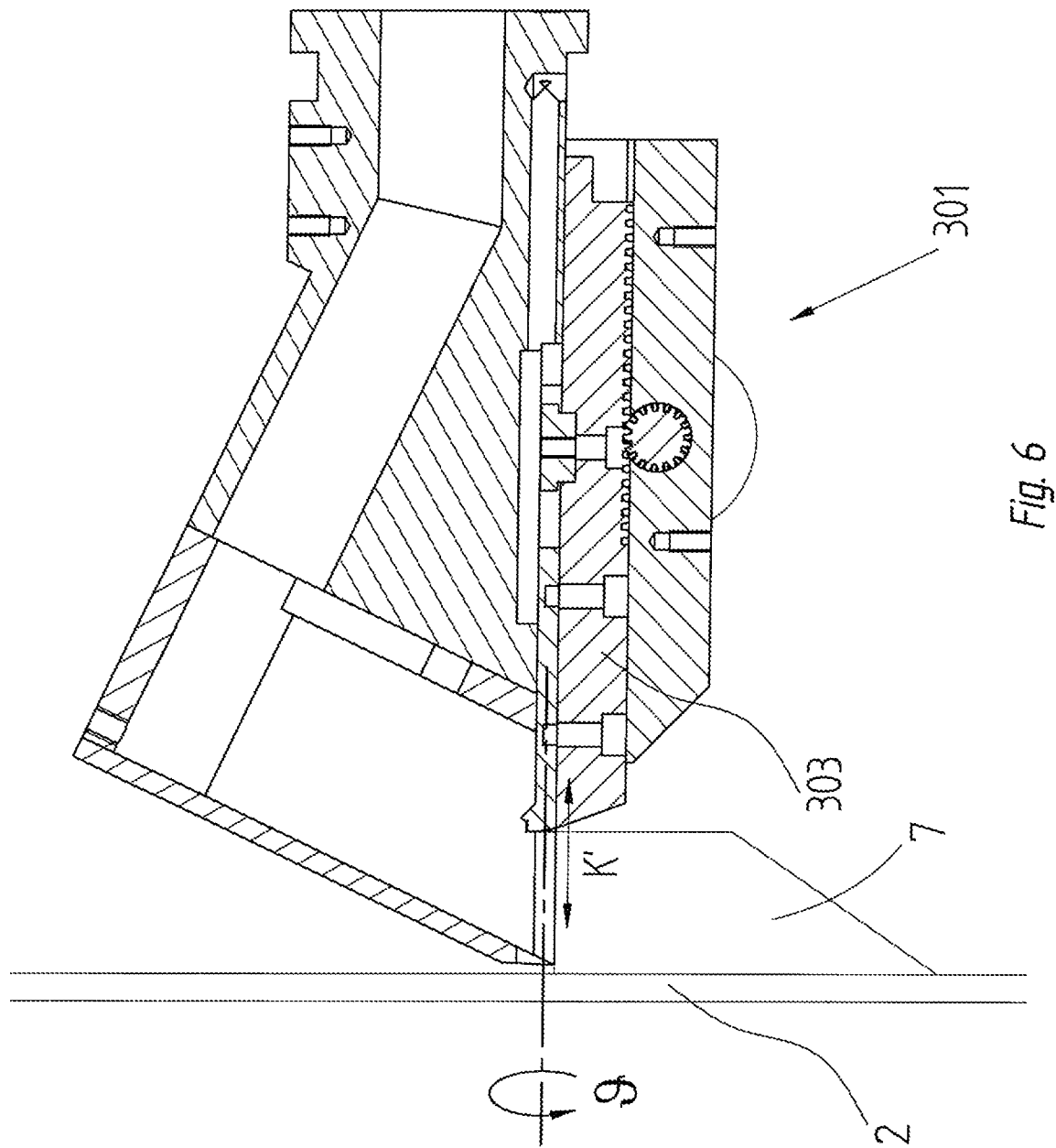

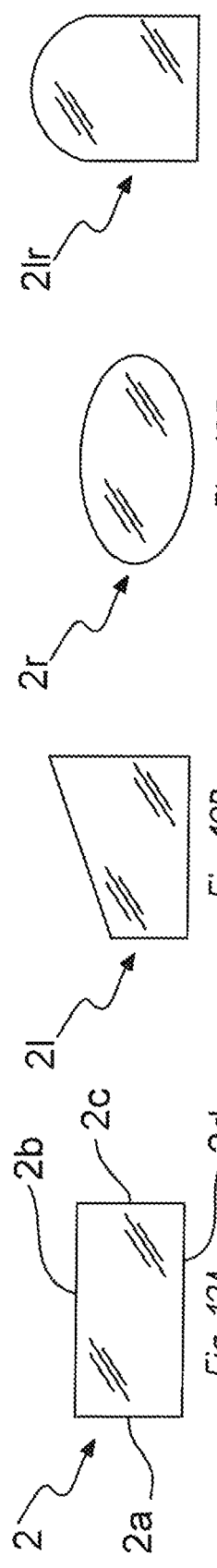
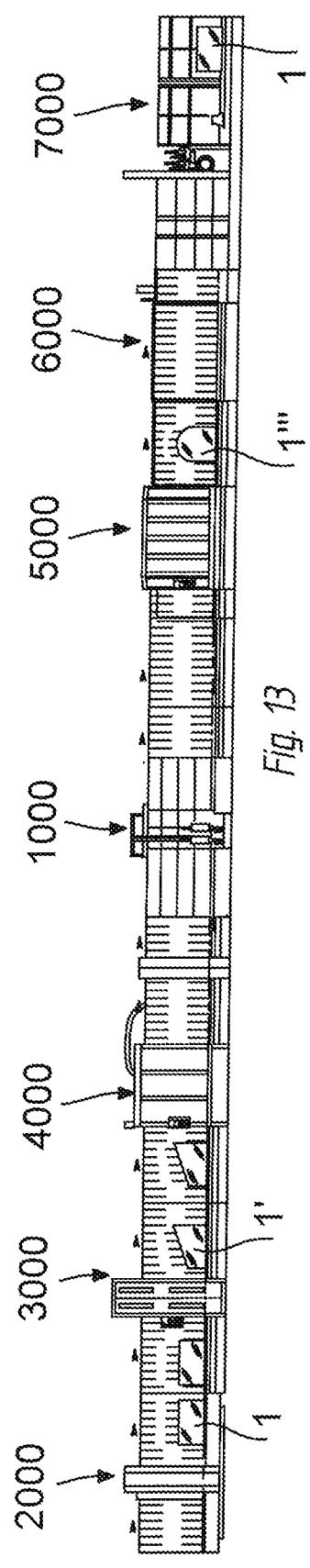
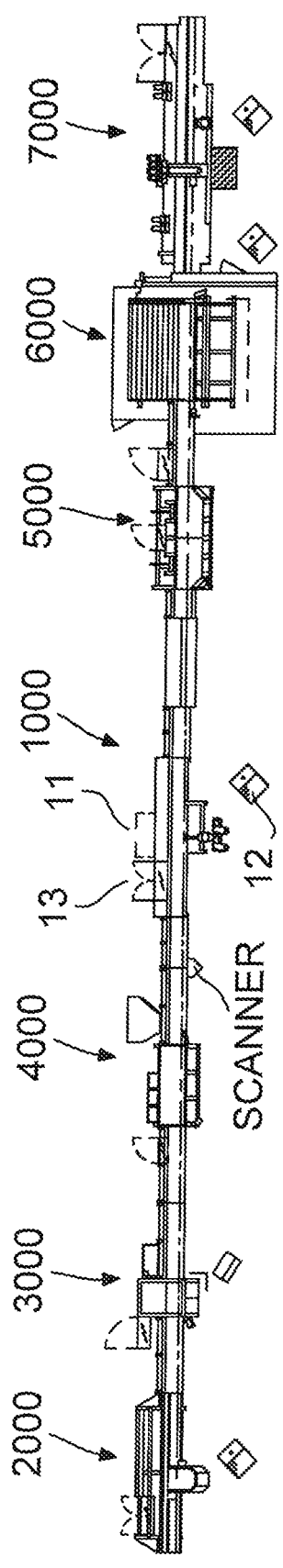

DEVICE AND PROCEDURE FOR EXTRUSION AND APPLICATION OF SPACER PROFILE OF AN INSULATING GLASS

The present finding relates to a device and a procedure for the extrusion and application of a spacer profile of insulating glass, particularly for a machine adapted to compose the spacer frame directly against one or more glass panes constituting the insulating glass starting from a thermoplastic product prevalently contained in drums, displacing the extrados thereof to an adjustable and controlled distance referred to the margin of one or more glass panes.

PRIOR ART AND INHERENT PROBLEMS

Nowadays, it is known to deposit the rigid spacer frame 3 or the flexible spacer profile 5 pre-coated with sealant 6 and/or adhesive 6' on a glass pane 2 and then to couple the whole with a second glass pane 2' and seal the entire outer periphery up to the margin of the glass panes to form what is known as insulating glass 1.

The operation may also be multiple to obtain insulating glass 1 constituted by three glass panes 2, 2', 2" and two frames 3, 3' or spacer profiles 5, 5', as well as "n" glass panes 2, 2', 2", 2"', etc., 2M, 2'm, 2"m, etc. and "n−1" frames or spacer profiles 3, 3', 3", etc., 5, 5', 5", etc.

(hereinafter, for ease of reading, the adverb etc. will be implied even if it is not written, and sometimes we will write generically glass pane 2, spacer profile 3, 5, 7, meaning the entire families or more simply glass pane, glass panes, spacer frame, spacer frames).

Although the beginnings date back to an idea of Saint Gobain implemented in the 1990s but soon abandoned, the solution has recently developed of extruding a thermoplastic product, more effective if of the reactive type, i.e. partially transformed into elastomeric by reaction with air humidity, against the face of one or more of the two or more glass panes to constitute a profile 7, 7', 7", etc. and then the spacer frame for the successive composition of the insulating glass.

Prevalently, the section of such profile is rectangular but sections having different shapes, e.g. with slightly convex extrados (orientation referred to the insulating glass chamber), can also be processed.

It is especially for such latter type of profile 7, 7', 7", and thus corresponding spacer frame, that the invention which is the object of the present application is of essential relevance in its multiple implementations, particularly when the real geometry of the glass panes differs, albeit slightly, from the theoretical geometry, a fact which occurs both accidentally and systematically. Furthermore, the invention also compensates for all the disturbances originated by the handling devices, meaning that it makes the positioning of the spacer profile 7, 7', 7" constantly referred to the margin of the glass panes although the panes themselves undergo jerking movements by the effect of the irregularities of the conveyors. Moreover, the main inventive concept illustrated below can also be applied to the type of profile 5, 5', 5" and, therefore, of spacer frame made of elastic and flexible synthetic material, supplied in coils.

Assuming as known the successive use of the insulating glass 1, i.e. in the fixture, in detail the insulating glass 1 is constituted by the composition of two or more glass panes 2, 2', 2", 2"', 2M, 2'm, 2"m, separated by one or more spacer frames 3, 3', 3", generally made of inorganic material, e.g. such as aluminum or stainless steel or mixed inorganic/organic material and the latter being generally made of polyvinyl chloride (PVC), functionally hollow and microperforated in the face facing towards the inside of the insulating glass, the spacer frames 3, 3', 3" containing hygroscopic material 4 in their hollow part and being provided with a butyl sealant 6 on the side faces (constituting the so-called first sealing) and the chamber (or chambers), delimited by the glass panes 2, 2', 2", 2"', 2M, 2'm, 2"m and the frame spacer (or frame spacers) 3', 3", 3", being able to contain, for example, air or gas 8 or gas mixtures 8 conferring particular properties, e.g. heat insulating and/or sound insulating properties, to the insulating glass.

Similar compositions are obtained by using a flexible spacer frame 5, 5', 5" having essentially rectangular section, possibly containing two receptacles on its sides for butyl sealant 6, made of foamed synthetic organic material, e.g. such as silicone or EPDM (Ethylene-Propylene Diene Monomer) and bearing in its sides or part thereof an adhesive 6' useful for mechanically bonding to the glass panes, or employing an extruded spacer profile 7', 7', 7", also having essentially rectangular cross-section made of thermoplastic material, and it is the latter that is dealt with particularly in the present invention; in such cases, the hygroscopic material 4 is distributed in the mass of the spacer profile itself because it is already contained in the compound which generates such profiles.

The union between glass panes 2, 2', 2", 2"', 2M, 2'm, 2"m and spacer frame or spacer frames 3, 3', 3" or 5, 5', 5" or 7, 7', 7" is obtained by means of two levels of sealing, the first 6 (also named "primary" in the industry), having the function of hermetically sealing and initially bonding such components and concerning the side surfaces of the frame and the portions of the adjacent glass panes, mentioned above (thermoplastic butyl sealant for the spacer frame conformations if of types 3 and 5, or constituted by the spacer frame itself if of type 7 made of thermoplastic material as is the case of the present invention), the second 9 (also named "secondary" in the industry), typically constituted by a two-component, elastomeric sealant, such as polysulphide (PS) or polyurethane (PU) or silicone (SI), processed at ambient temperature, but also constituted by a single-component sealant of the type processed at ambient temperature or hot-processed, having the function of making the definitive cohesion between the components and mechanical strength of the joint between them, and concerning the compartment constituted by the extrados of the spacer frame 3, 5, 7 and the inner faces of the glass panes up to the edge thereof (see from FIG. 1A to FIG. 1F, all of which have component 9 in common).

In the case of spacer profile 5 made of foamed synthetic material, the first sealing level is replaced by (in this case, not retaining the sealing function) or may be integrated with (in this case, retaining the sealing function) an adhesive 6', e.g. acrylic, previously sprinkled on the side faces of the spacer profile itself and coated with a removable protective film (see FIG. 1D in which such film is shown already removed).

The glass panes 2, 2', 2", 2"', 2M, 2'm, 2"m used in the composition of the insulating glass 1 may have different conformations according to the use thereof, e.g. the outer glass (i.e. outer with respect to the building) can be normal or reflective or selective (to limit heat input during the summer months) or laminated/armored (for anti-intrusion/vandalism/bulletproof functions) or laminated/tempered (for safety functions) or combined (e.g. reflective and laminated to achieve a combination of properties), the inner glass (i.e. inner with respect to the building) can be normal or low emissivity (to limit heat loss during the winter months) or laminated/tempered (for safety functions) or combined (e.g. low emissivity and laminated to achieve a combination of properties).

All such types of glass panes suffer from errors in the dimensions according to the two directions x, y on the plane, and sometimes also according to the third dimension z in the sense of non-planarity.

It is already apparent from this brief overview that a manufacturing line for obtaining the insulating glass product 1 requires many processes in cascade, and in particular comprises the one concerning the formation of the spacer frame, whether of the "extruded thermoplastic" type or the "flexible foamed synthetic" type, to both of which the present application provides an improving contribution.

The processes for the production of the insulating glass 1, each requiring a respective, particular machine to be arranged in series with respect to the other complementary machines, are, by way of non-exhaustive example, and equally not all necessary, the following:

EDGE PREPARATION on the peripheral face of the glass to remove any coatings to allow and maintain the bonding of primary sealant 6 and secondary sealant 9 over time;

ROUNDING of the sharp edges of the glass, both to eliminate marginal defects introduced by the cutting operation, which could potentially trigger cracks, and to reduce the risk of injury during subsequent handling of the glass panes 2, 2', 2", 2''', 2M, 2'm, 2"m and of the finished insulating glass 1;

WASHING of the individual glass panes, with alternation of inner glass/possible intermediate glass panes/outer glass (the orientation being the one defined above);

APPLICATION OF THE SPACER FRAME: The previously manufactured spacer frame 3, 3', 3", filled with hygroscopic material 4 and with thermoplastic (butyl) sealant 6 sprinkled on the side faces, having sealing functions against the ingress of moisture and the escape of gas 8, on machines off the production line of the insulating glass 1, is applied on one of the glass panes constituting the insulating glass 1 in a special station of the production line of the insulating glass 1; alternatively, a continuous strip of spacer profile 5', 5', 5" is unwound from a coil and applied onto one of the glass panes until a closed frame is formed, directly constructed in adhesion, operated by the adhesive 6', onto one of the glass panes, after having removed the protective film, on the same production line as the insulating glass 1; again alternatively, and this is particularly the case described in detail in the present invention, the spacer profile 7, 7', 7" is directly extruded and shaped with adequate section against the face of one of the glass panes 2, 2', 2", 2M, 2'm, 2"m also until a closed spacer frame is formed;

COUPLING AND PRESSURING of the whole of glass panes/frame (or frames);

FILLING WITH GAS of the chamber (or chambers) thus obtained, e.g. actuated in the same machine which operates the functions of the previous paragraph, or in a successive machine, as shown in the figures indicating the complete layout of the production line of the insulating glass 1;

SECOND SEALING of the whole of the components 2, 2', 2", 2''', 2M, 2'm, 2"m, and spacer frame 3, 3', 3", 5, 5', 5", 7, 7', 7", at the perimeter.

The processes listed above may be carried out, by the respective machine, automatically, semi-automatically, or, for some operations, manually.

Machines and processes for the extrusion of spacer profiles made of thermoplastic material directly against one or more glass panes 2, 2', 2", 2''', 2M, 2'm, 2"m are known.

Such a prior art leads us to the following only priorities:

U.S. Pat. No. 5,961,759 with German priority DE 44 33 749 of 22 Sep. 1994 and international correspondent WO 96/09456 (A2) owned by Lenhardt Maschinenbau GmbH.

Two more inventions follow: EP 0 823 318 B1 with German priority DE 196 32 062 C1 of 9 Aug. 1996 and EP 0 823 531 B1 with German priority DE 196 32 063 C1 of 9 Aug. 1996, both of which are by the same owner as above, introducing the variant in start and end of extrusion transients.

Afterward, there are US 2012/0180936 A1 with German priority DE 10 2009 035 002.0 of 24 Jul. 2009 and international correspondent WO 2011/009554 A1 owned by Bystronic Lenhardt GmbH and Peter Schuler, which introduces the simultaneous and parallel extrusion of two different product types so that one strip has vapor/gas barrier properties and contains the desiccant diffused in its mass and the other has mechanical stability properties of the joint. The second sealing, as described in the processing cycle of the insulating glass 1, can be omitted, with the advantage of eliminating a very expensive machine, although complicating the formation of the spacer frame.

The latter title should be taken as a reference because it describes the complete transfer circuit and a dispensing solution of the products from the storage drums to the extrusion nozzle to avoid describing what belongs to the prior art in detail.

The prior art is also apparent from WO 2015/113080 A1 with Austrian priority A 59/2014 of 28 Jan. 2014 owned by Lisec Austria GmbH and finally from U.S. application Ser. No. 15/668,443 having priority of 4 Aug. 2016 by the owner of the present application.

Such prior art consolidated in the machines based on the teachings of the main patent titles referred to above suffer from a common drawback that is validly solved by the present invention.

As apparent from the FIGS. 2, 3, 4, 8 described below, the relative movement between glass pane 2, 2', 2", 2''' and extrusion nozzle 301 is achieved through mechatronic mechanisms driven by synchronous motors respectively according to mutually interlaced axes H, V, ϑ, while at least one further axis K, also driven by a synchronous motor, governs the delivery of the molten compound in interaction with the aforesaid axes.

Such axes are all extremely precise because each brushless synchronous motor is provided with a resolution of one ten-thousandth of a revolution and thus the absolute position of the nozzle in space is very precise, at most the combined errors related to tolerances in mechanical machining, clearance in mechanical couplings and wear during the run-in and use are in the order of ±0.05 mm.

Another transverse axis Z concerns the adjustment of the position of the nozzle 301 to adapt to the thickness of the glass panes but, in the prior art, this is not controlled as a process function.

The geometry of the glass panes is not equally precise, either along the two main directions according to the x, y axes by the effect of the inaccuracy of the cutting process of the glass panes themselves (x and y of the glass panes corresponding respectively to synchronous H and V of the machine), or according to the z axis due to the non-planarity of the glass panes (z corresponding to Z, which is non-synchronous and only with position feedback, of the machine, at least in the described known art).

It follows that the location of the extruded profile 7 is extremely accurate in space but not sufficiently rational for the functionality required of the perimeter joint, the prevailing requirement of which is to maintain a constancy of depth p of the secondary sealant, which is only achieved if the distance between the extrados of the spacer profile 7 and the outer margin of the glass pane is uniform, i.e. only under conditions of perfect geometry of the glass pane. Such constancy of depth guaranteeing the functions of the secondary sealant of: structural bonding of the glass pane/spacer frame components; hermetic sealing against the penetration of moisture from the outside to the inside of the insulating glass; hermetic sealing against the escape of pressure-regulating gas from the inside to the outside of the insulating glass, which gas tends to migrate to areas lacking secondary sealant being subject to Dalton's law of partial pressures.

It also follows that, due to the non-planarity of the glass panes, the approach of the nozzle 301 to the face of the glass pane, carried out in the prior art with absolute positioning or at most with a feedback of the contact position but not of the contact force control, results being excessively forced in some positions or even detached in others.

Therefore, it is the main task of the object of the present application to eliminate the drawbacks referred to in the prior art by devising a device and a procedure allowing the optimum execution of the perimeter joint between the glass panes and the spacer frame, given the important functions of this joint for the purposes, in a word, of the durability of insulating glass 1.

In the scope of the task generically set out above, it is an object of the present invention to obtain the constancy of depth of the secondary sealant 9, meaning the distance between the extrados of the spacer frame and the actual margin of the glass panes, margin which is different from the one transferred as data entry by the information system.

It is another object to achieve such configuration of the perimeter joint configuration, both for rectangular shape insulating glass, for insulating glass of polygonal shape with all straight sides, and for insulating glass of completely curved shape, as well as for insulating glass of polygonal shape with at least one curved side.

An object, which is not less important but a necessary complement of the illustrated task, to control the approaching force of the extrusion nozzle against the face of the glass pane.

All the objects are within the inventive unit constituted by the optimization of the cavity to the edge intended for filling with secondary sealant 9, but such that each one deserves its own independent claim.

DESCRIPTION OF THE INVENTION

The description of the drawings and the detailed description of a particular, but not exclusive, embodiment of the invention, illustrated by way non-limiting example in the appended drawings, will clarify how the invention which is the subject of the present application can be implemented.

DESCRIPTION OF THE FIGURES

FIGS. 1A, 1B, and 1C show the rigid frame type 3 made of metal profile (typically aluminum or stainless steel or combined stainless steel/plastic) which is hollow and filled with hygroscopic material 4, while FIG. 1D shows the flexible frame type 5, incorporating hygroscopic material 4 in its mass.

Figure 1:
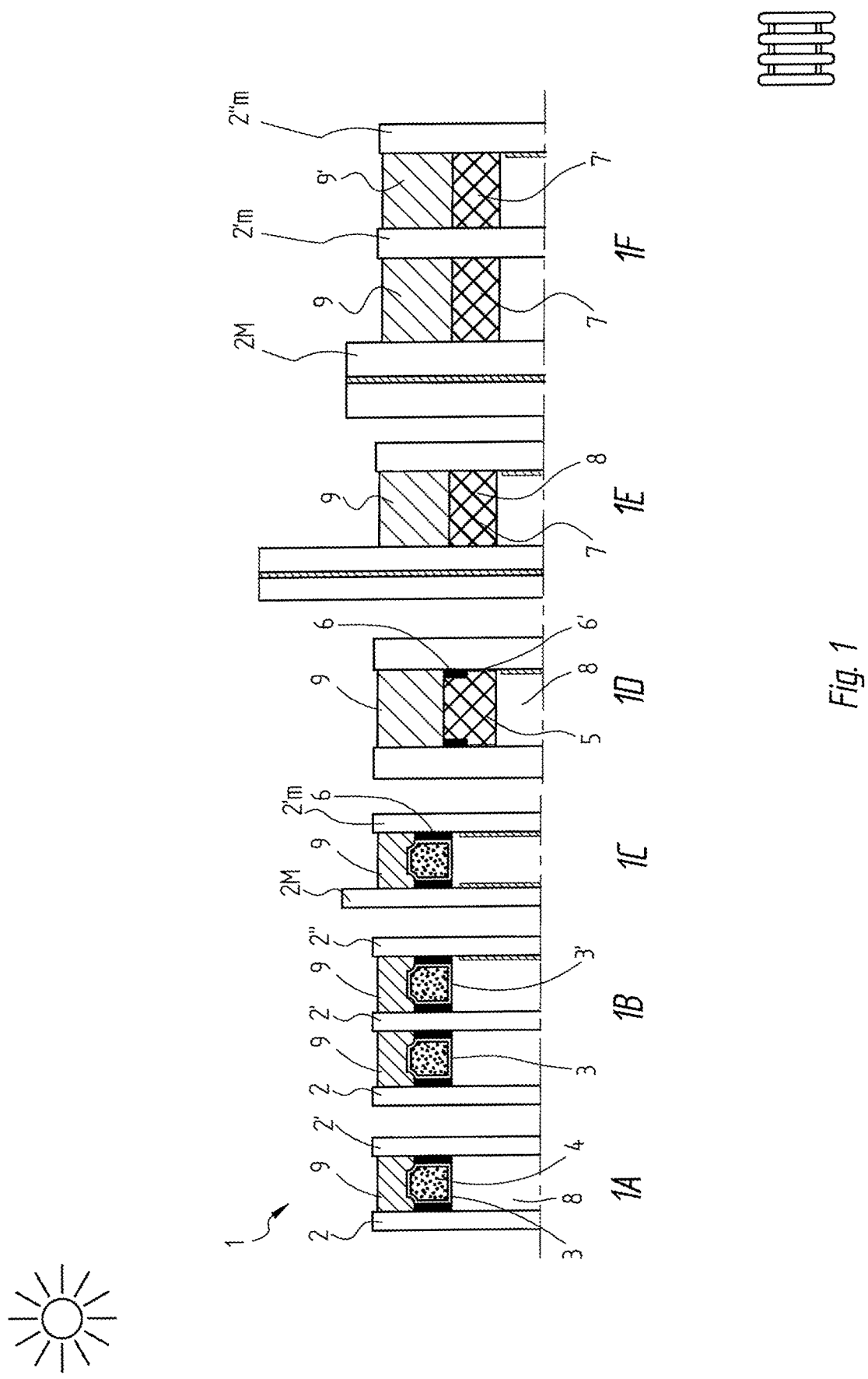
FIGS. 1A to 1F diagrammatically show the peripheral portion, previously named joint, of the insulating glass 1 in a non-exhaustive series of possible combinations (in which rigid frames, flexible frames, and thermoplastic frames are all shown): 1A normal; 1B triple glass, with inner glass with low emissivity coating; 1C outer glass with selective coating and offset relative to the inner glass with low emissivity coating; 1D outer tempered glass and inner glass with low emissivity coating; 1E outer glass laminated and offset relative to the inner glass with low emissivity coating and spacer frame made of thermoplastic profile 7 which is dealt with in the present invention; 1F triple glass, with outer laminated glass offset relative to the remaining two glass panes, of which the inner one with low emissivity coating and spacer frames with thermoplastic profile 7, which is dealt with in the present invention.

The two types of sealant employed are shown in section: filled in black is the sealant butyl 6 having initial bonding function between the components and sealing (first sealing and primary sealant), in the case of a flexible frame acrylic adhesive 6' is used instead (only indicated but not shown because it is only a few m thick) or the combination of both the acrylic sealant 6' and the butyl sealant 6' applied between the receptacles of the side surfaces of the frame and the glass, as shown in FIG. 1D; in wide hatching is the polysulphuric (PS) or polyurethane (PU) or silicone (SI) sealant 9 having the function of mechanical bonding to the edge and sealing (second sealing and secondary sealant) applied between the extrados of the frame and the faces of the glass panes to the edge of the glass panes or glass pane 2'm having smaller size (in the case of offset glass panes).

The secondary sealant also contributes, although less than the primary sealant, to the sealing against the ingress of moisture and the leakage of the gas 8.

FIGS. 1E and 1F show the cases in which the spacer frame 7 is constituted by the extruded thermoplastic product for which the present invention provides an innovative solution regarding its location relative to the glass pane.

The inner/outer orientation is visually identified by icons representing the sun (outer side) and a radiator (inner side).

From such figures, which show only a few examples, it is already apparent that the insulating glass 1 may have multiple conformations, particularly in the evolution of the type of spacer frame, which goes, referring to large families, from the rigid profile frame 3 entirely prefabricated and mounted against one or more glass panes, to the flexible profile frame 5 unwound from a coil directly against one or more glass panes, to the thermoplastic product frame 7 extruded directly against one or more glass panes. It will also be shown that the present invention can be applied both to the execution with extruded thermoplastic profile frames 7 and to the execution with flexible profile frame 5 unwound from a coil.

Figure 2:
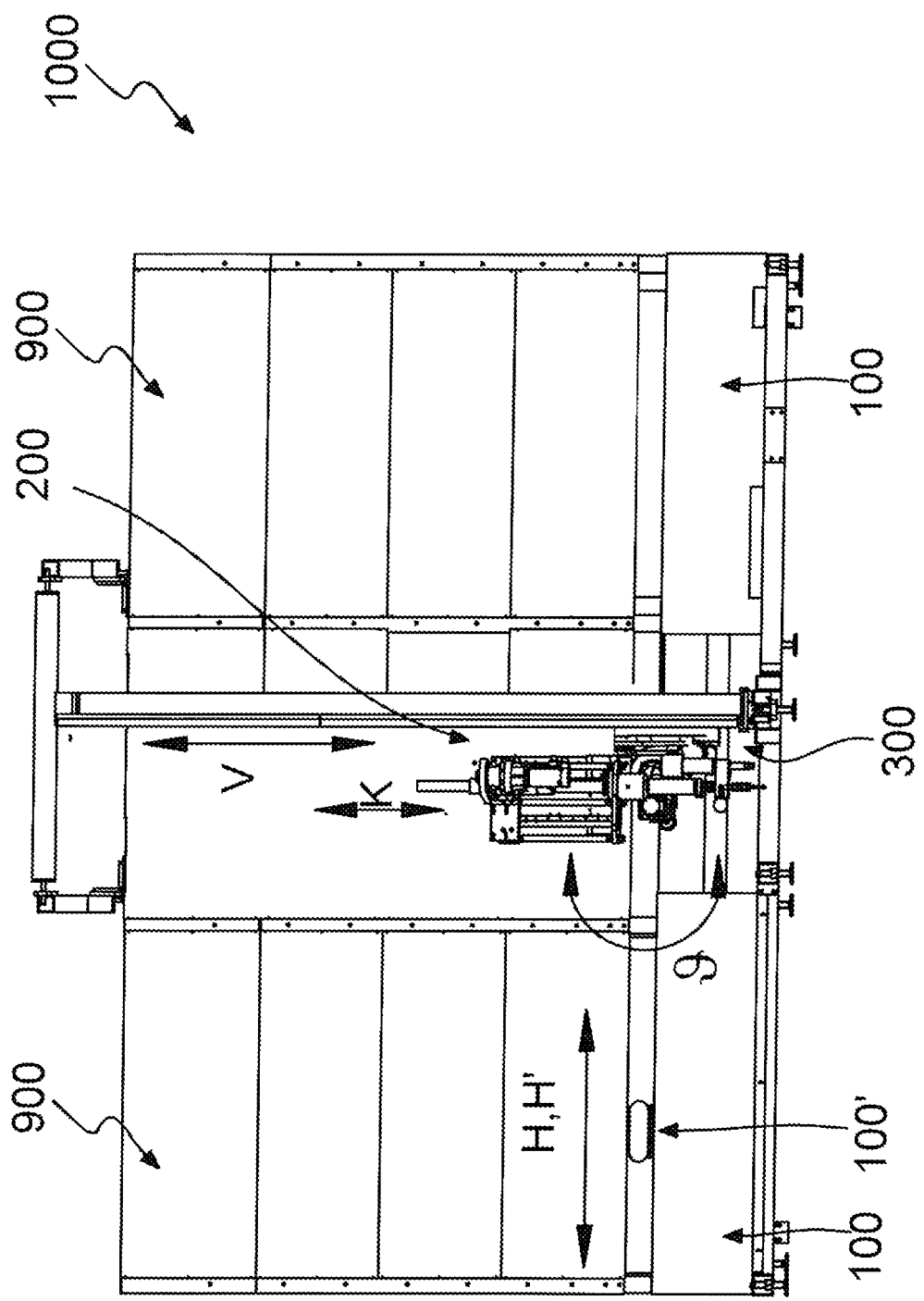
Figure 3:
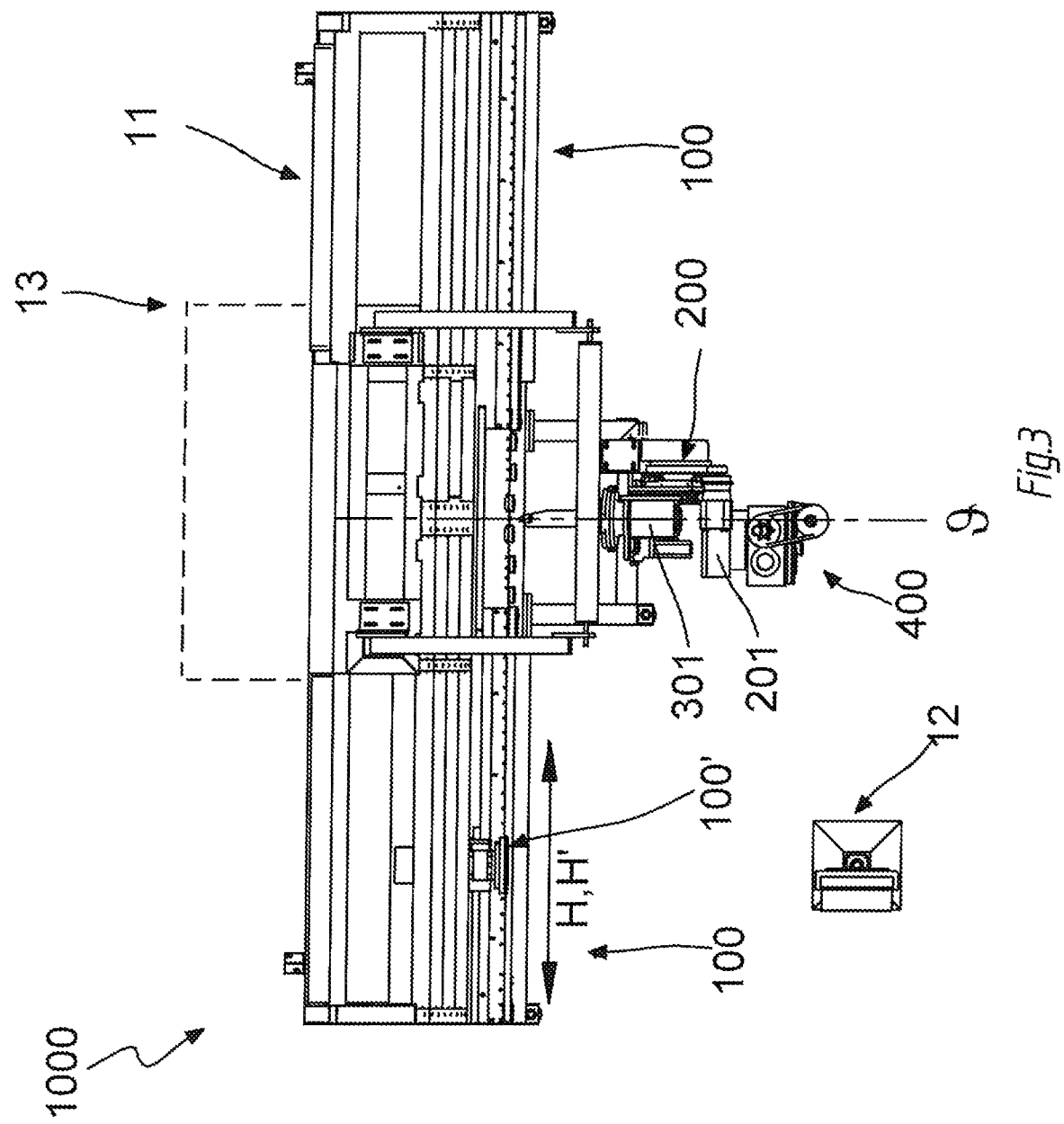
Figure 4:
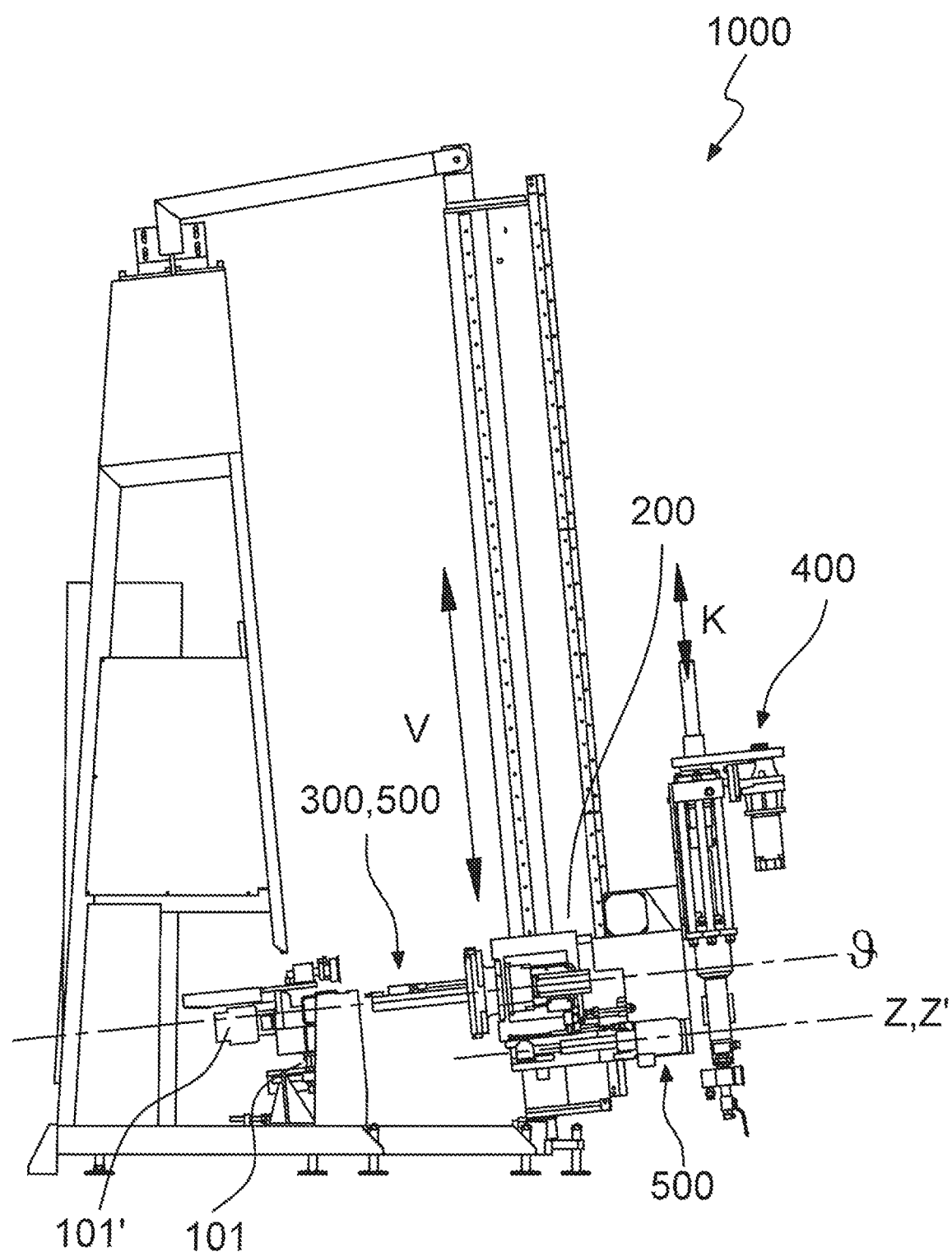

FIGS. 2, 3, 4 show the prior art of the automatic machine 1000 for forming the spacer frame obtained by extrusion of the spacer profile 7 by means of the dispensing device, the axis K of which is driven by synchronous motor and is interfaced with the system of axes H, V, ϑ driven by synchronous motors through mechatronic mechanisms, respectively, in its overall main views: front, top, side.

Such figures identify: the horizontal axis H [actuated by the group 100 means of the known type constituted by the pseudo-horizontal motorized conveyors acting on the lower edge d of the glass pane 2, 2', 2", 2''', 2M, 2'm, 2"m and the suction cup carriage 100' acting on the face of the glass pane 2, 2', 2", 2''', 2M, 2'm, 2"m, while the glass pane itself remains resting on the same pseudo-horizontal motorized conveyors, slightly inclined with respect to the horizontal plane, and on a pseudo-vertical sliding plane 900, slightly inclined with respect to the vertical plane, provided with idle wheels or air cushion; the vertical axis V (group 200 of the known type) and the rotation axis 9 (group 300 of the known type).

Figures 5A, 5B:
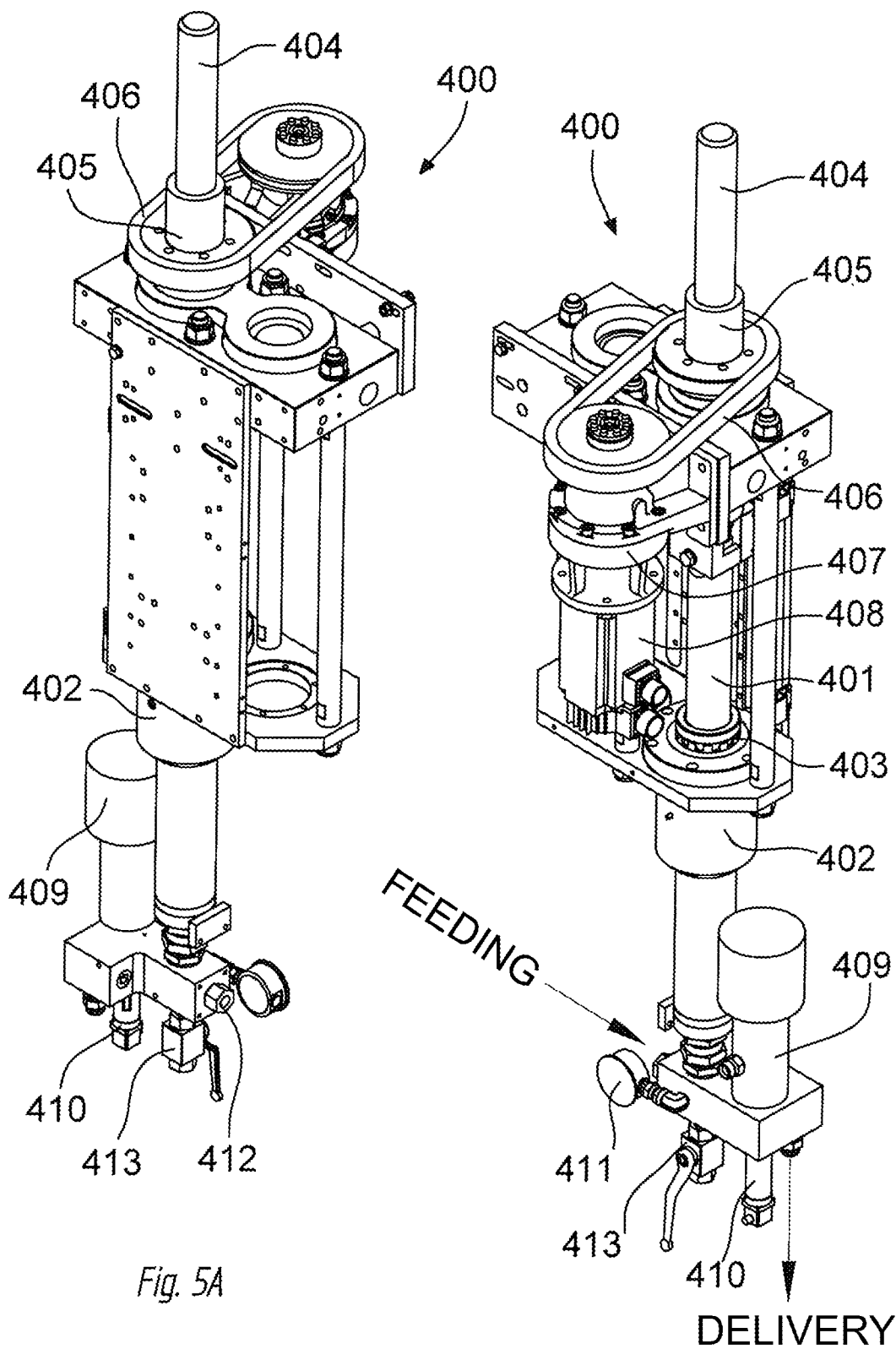

FIGS. 5A, 5B show, with opposing views, a possible solution of the dispensing assembly (group 400 of the known type, in a simpler version than the twin version, U.S. Ser. No. 15/668,443, by the same owner of the present application, which is not the inventive core) driven by a synchronous motor through mechatronic mechanisms according to axis K for extrusion through the nozzle 301 of the spacer profile against the face of the glass pane 2, 2', 2", 2''', 2M, 2'$m$, 2"$m$ to constitute the closed spacer frame 7, 7', 7''', the section of the spacer profile being adjustable as a function of the desired width w through another axis K', driving the mobile bulkhead 303 through mechatronic mechanisms and motor, which becomes synchronous with those of the other axes H, V, ϑ, K for the initial and final profiling of the spacer profile in the so-called butt joint, according to the known art which implements such joint by increasing and decreasing in complementary manner the width w of the initial and final sections of the profile.

FIG. 6 shows the solution, known from U.S. Pat. No. 5,961,759A, concerning the constitution of the nozzle 301, with identification of the synchronous axis K'.

Figure 7:
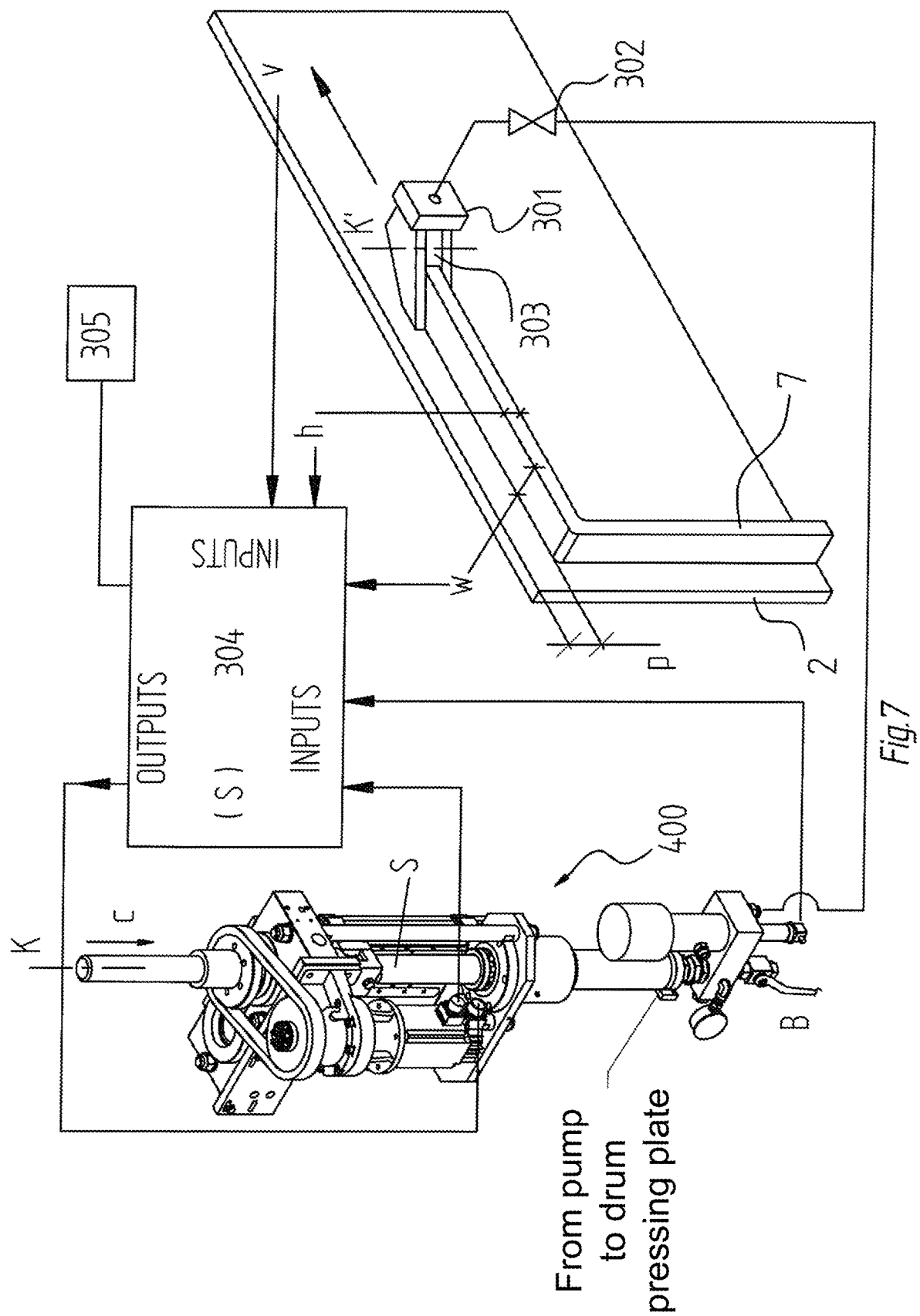

FIG. 7 shows the circuits and the logic and power controller, with identification of the synchronous axis K for the delivery of the product to the nozzle 301 which can be cut off by the valve 302.

Figure 8:
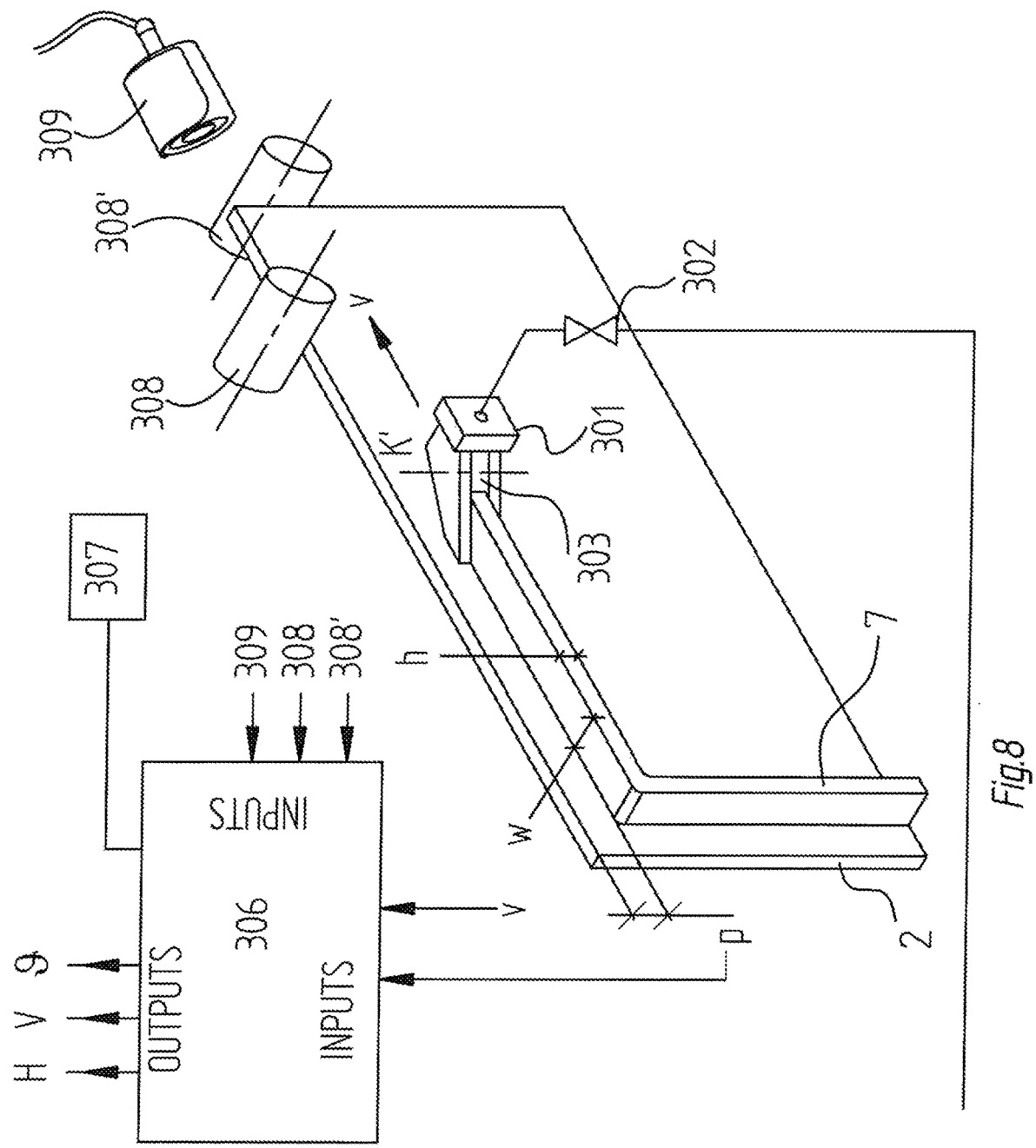

FIG. 8 shows the inventive core of the present invention constituted by the feelers of the edge of the glass pane 2, inventive core which can also be carried out in alternative manners, which are claimed. It also shows the logic and power circuits and controller 306 with the identification of axes H, V, ϑ.

Figure 9:
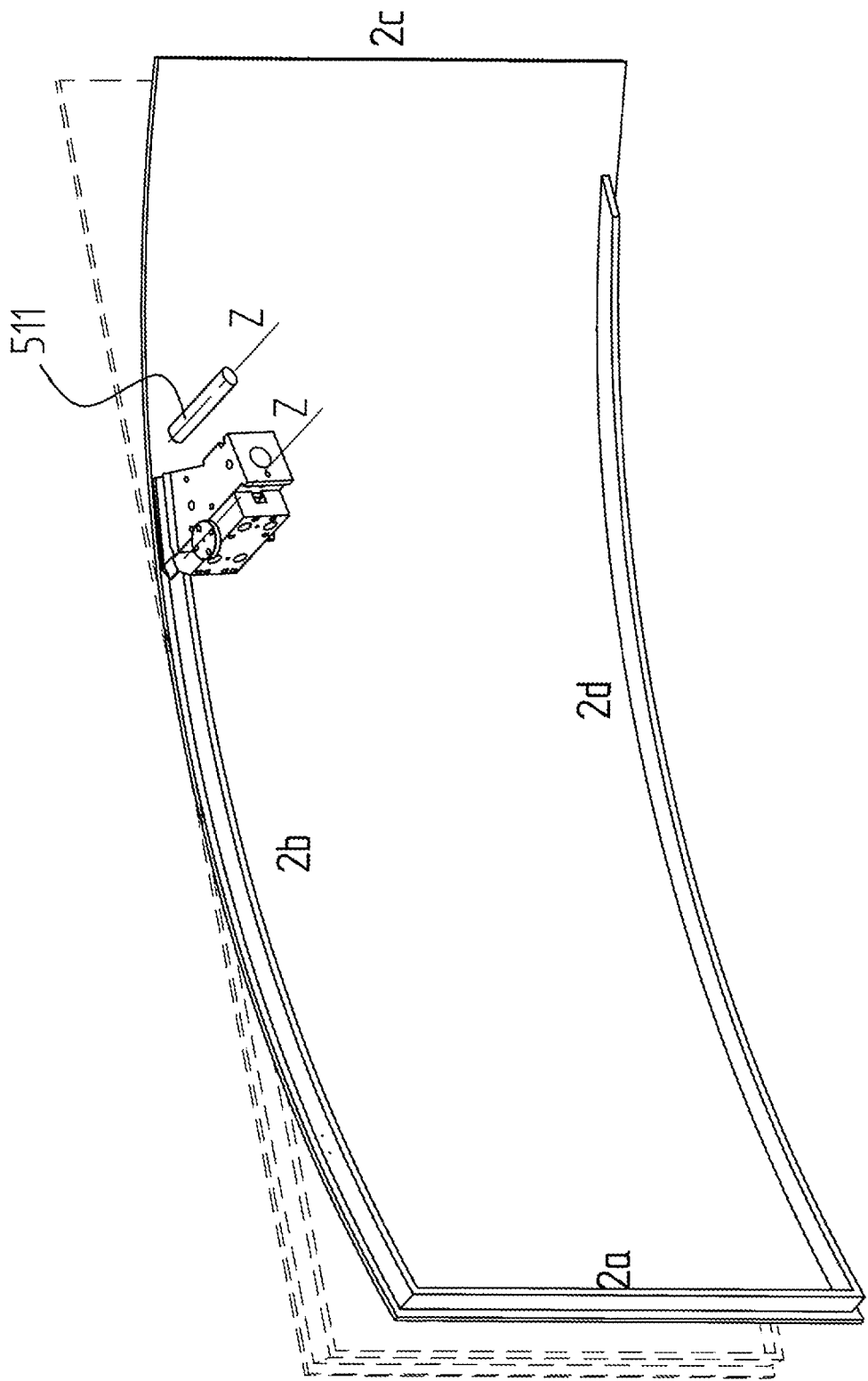

FIG. 9 shows the completion of the inventive core consisting of the chasing of the geometric irregularity of the glass pane in the third direction z due to non-planarity.

Figure 10:
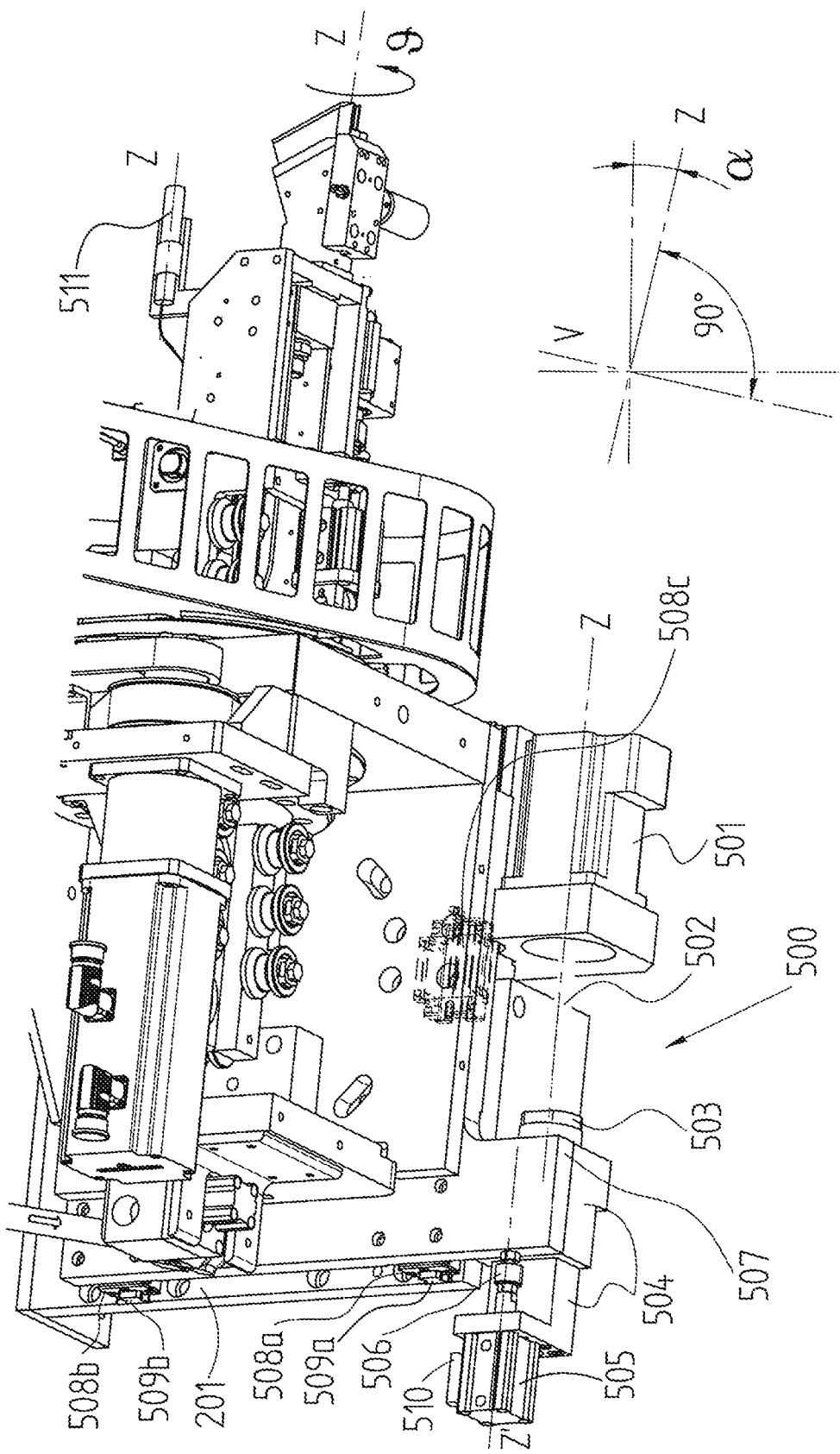

FIG. 10 diagrammatically illustrates the approach principle of the nozzle 301 against the face of the glass pane, concerned by the application of the extruded thermoplastic profile, principle that reconciles the need to chase the non-planarity, highlighted in an emphasized manner in FIG. 9, of such glass pane and of applying a thrust force of the profile towards such face within an appropriate range of values, let's say "soft", to solve the problems inherent in the prior art, i.e. to avoid the non-contact of spacer profile/glass pane or excessive interference of spacer profile/glass pane.

It also indicates, by separating them from the known devices of the application head which are superfluous for the inventive concept, all the components (actuator, potentiometer, mechanical parts, etc.) the interaction of which implements the "soft" operation.

Figure 11:
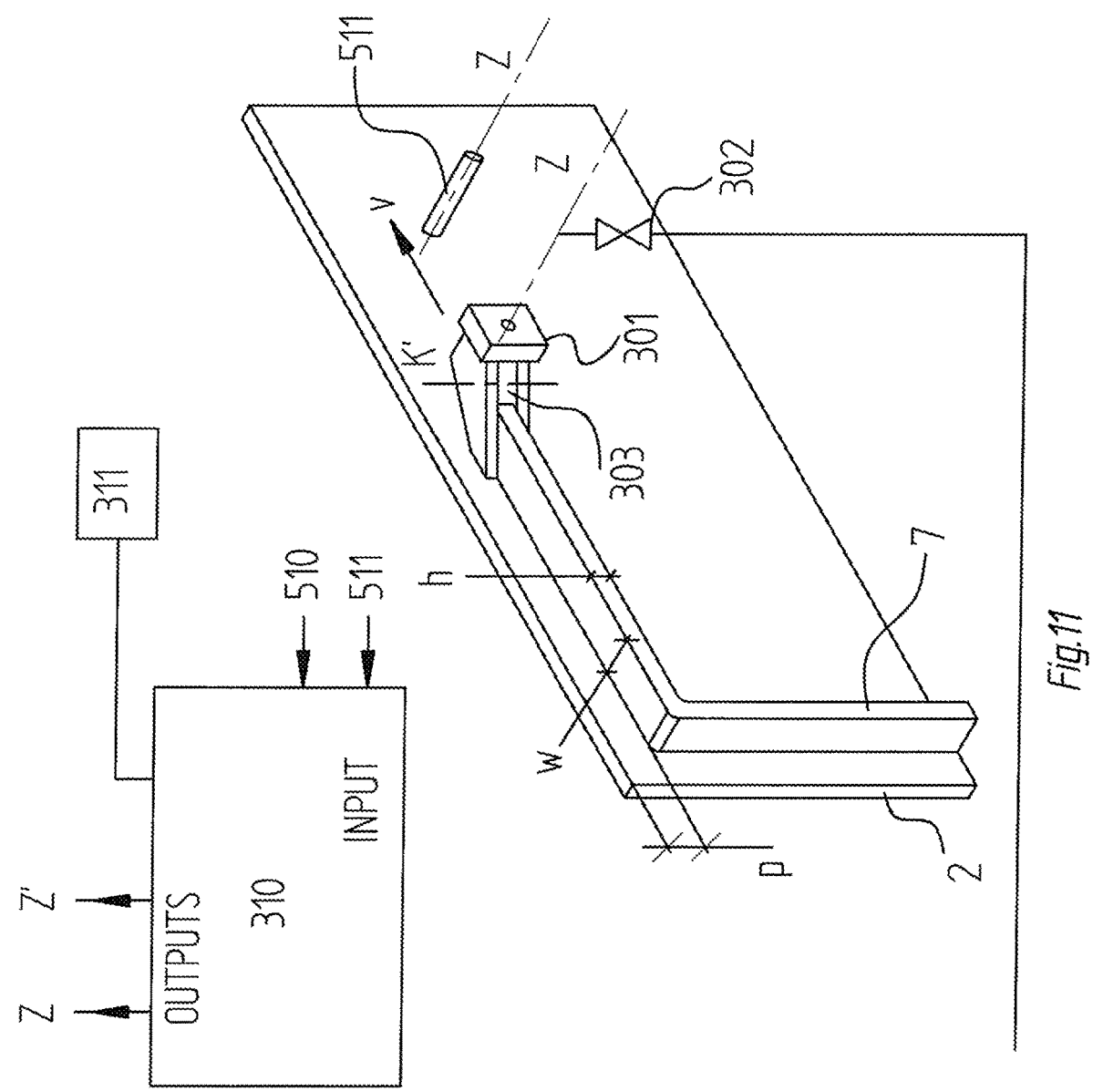

FIG. 11 shows the sensors used for the feelers in position (sensor 511) and force (transducer 510), as well as the logic and power circuits and controller 310 with identification of axes Z, Z'.

FIGS. 12A, 12B, 12C and 12D show the glass pane in the rectangular 2, polygonal 2*l*, curvilinear 2*r*, mixed 2*lr* conformations, respectively.

In the case of rectangular conformation 2, the sides are indicated, with lower case letters, in one of the possible application sequences of the spacer profile to form the spacer frame 7 or 5 according to the progression: side a, angle a/b, side b, angle b/c, side c, angle c/d, side d, angle d/a.

FIG. 13 is an example of insertion of the automatic machine 1000, for forming the spacer frame 7 obtained by extrusion of the spacer profile or for forming the spacer frame 5 obtained by application of a flexible profile, by means of the logic and the innovative devices described in the present invention, in the production line of the insulating glass 1 (elevation view), the process of which develops in the direction from left to right, and does not comprise: electrical/electronic panel, control panel and protection devices.

FIG. 14 is an example of insertion of the automatic machine 1000, for forming the spacer frame 7 obtained by extrusion of the spacer profile or by forming of the spacer frame 5 obtained by application of a flexible profile, by means of the logic and the innovative devices described in the present invention, in the production line of the insulating glass 1 (plan view) and includes: electrical/electronic panel 11, pulpit of protective equipment, indicated in general by reference numeral 13, being mechanical guards, or optical barriers, or laser barriers, or electro-sensitive mats, or zone scanners, etc., as particular attention is paid not only to the functional, qualitative, productive aspects of the content of the present invention, but also to aspects related to accident prevention.

Figure 15:
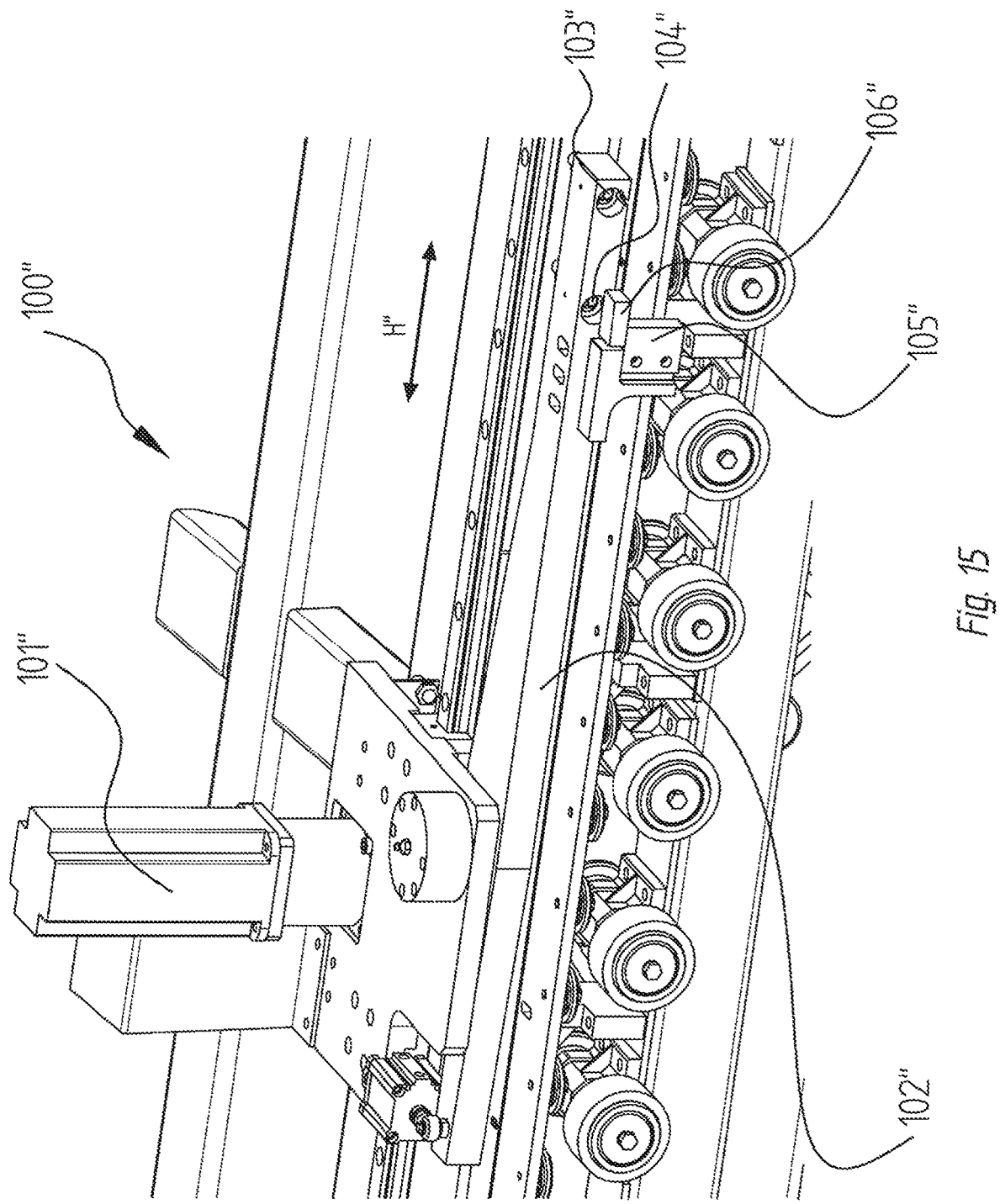

FIG. 15 is an important accessory, current according to the horizontal axis H" parallel to axes H' and H', for the correct initial positioning of the glass pane.

The insulating glass 1, glass pane 2, 2', 2", 2''', 2M, 2'$m$, 2"$m$, spacer frame 3, 3', 3", 5, 5', 5", 7, 7', 7" and other components thereof are identified by numbering with digit and possible superscripts and subscripts. In particular, to distinguish the various possible conformations of the insulating glass 1, as already mentioned, reference numeral 1 indicates the most frequent situation (rectangular), with 1' being the polygonal shape, 1" being the curved shape, and 1''' being the mixed shape.

The components interfaced with the device in the present invention are identified by a two-digit number.

The main components of the inventive device which is the object of the present application, i.e. the 300 and 500 series, and known related devices, are identified by three-digit numbers, wherein those containing two zeros refer to sets or groups while the others refer to their respective details.

The machines belonging to the production line of the insulating glass 1 are identified by four-digit numbers, in the order described above, reserving numeral 1000 for the automatic machine for forming the spacer frame obtained by the controlled and innovative extrusion of the spacer profile 7 (or by laying the spacer profile 5 made of elastic and flexible synthetic material). The other numerals used are: 2000 for the edge preparation machine, 3000 for the grinding machine, 4000 for the washing machine, 5000 for the coupling machine-press, 6000 for the gas loader, 7000 for the sealing machine.

MODES FOR CARRYING OUT THE INVENTION

We now provide a detailed description of an embodiment of the invention.

To describe an embodiment of the invention, which comprises all the equivalents, reference will be made to figures from 5 to 11 and 15 for general concepts and for the details adapted to make one or more of the possible implementations of the invention fully comprehensible to the person skilled in the art.

It is given as known, and thus not requiring detailed description (because it belongs to the prior art), the matter partially shown, or not shown because it can be inferred, in FIGS. 2, 3, 4 related to the machinery provided with synchronous axes H, V, ϑ and of the adjustment axis Z (only the adjustment function but not the control function is known) and synchronous axes K for dispensing and K' for adjusting the profile according to the width w, because both the priorities described above and the knowledge of the person skilled in the art do not require any clarifications for the construction of such parts regarding the spacer profile extrusion machine against the face of the glass pane, the machine substantially being formed by the groups: 100 for the motion according to the synchronous horizontal axis H of the glass pane through conveyors acting at its lower edge 2*d*; 100' for the motion according to the synchronous horizontal axis H of the glass pane through a suction cup carriage which interacts with the front face of the plate itself, the aforesaid conveyors may not be effective, due to the slip of the plate, even if they are synchronous; 200 for the motion of the extrusion head according to the synchronous vertical axis V; 300 for the extrusion head rotating according to the polar axis ϑ; 400 for the motion, according to axis K, of the dispensing mechanism generally consisting of a syringe; obviously in the case of a two-component product (base+ catalyst), if the market were to make such a product available although it is not so today, the dispensing assembly will be provided with two syringes, one for the base product, one for the catalyst product. Such mechanism, although known, is presented here again with more details being in direct correlation with the innovative principles summarized in FIGS. 7 to 11.

The dispensing assembly, in one of the possible embodiments, comprises the following essential components: 401 plunger or syringe; 402 cylinder or chamber; 403 seal; 404 ball screw; 405 ball nut; 406 mechanical transmission, e.g. toothed wheel/chain type; 407 mechanical reducer; 408 synchronous electric motor. It is needless to say that these components are constrained partly to an upper plate and partly to a lower plate connected by tie rods, structural elements as shown in FIGS. 5A, 5B, which, in turn, are fixed to a plate for the connection to the vertical carriage 200, moving axis V so that the distance between dispenser and extrusion head is limited to contain the pressure drops, considering the response that must be guaranteed by the axis K in the start and end of extrusion transients and the singular portions, such as those at the corners of the spacer frame. The dispenser further comprises the following accessory components, however indispensable: 409 three-way valve, which can be replaced by two two-way valves or by a two-way valve and a check valve; 410 pressure transducer; 411 pressure gage; 412 pressure relief valve or rupture disc; 413 manual valve for drawing or purging.

In FIG. 7, the interrupted zone on the left is considered as known, in particular in part of FIG. 1 of US 2012/0180936 A1, constituting the supply of the product to the dispensing assembly 400 as coming from the pump, typically of the double-acting type placed on the pressing plate of the product storage drum, for the feeding transfer to the dispensing assembly 400.

In general and referring to the most common glass pane configuration, i.e. that of rectangular shape 2, the progression of the extrusion of the spacer profile along the sides is typically as follows: first vertical side 1*a*, second upper horizontal side 1*b*, third vertical side 1*c*, fourth lower horizontal side 1*d*. The unavoidable transients of the product flow at the corners in which the nozzle 301 must rotate by 90° are managed in the prior art by reducing the relative speed between nozzle 301 and the periphery of the glass pane and corresponding reduction of the product flow rate until the cancellation of such relative speed and the cancellation of the flow rate in the extrusion start and end position.

Instead, the prior art neglects, with consequences that are decremental for the quality of the perimeter joint, that the control of the relative path of nozzle 301—glass pane 2 carried out according to absolute axes H, V, ϑ, implies that the distance p between the extrados of the spacer profile 7 and the outer margin of glass pane 2 is not constant, but varies by a few mm, due to the inaccurate flat geometry of the glass pane 2.

The device claimed here, on the other hand, by means of feelers 308, 308' or camera 309 located upstream of nozzle 301, controls the real position of said margin and, with feedback on the axis V if movement according to axis H is in progress or vice versa, adapts the position of the nozzle 301 as a function of the size to be controlled constituted by parameter p. This happens in a rather simple manner, in terms of process control, if the side on which the extrusion of the profile 7 is in progress is rectilinear because the feeler is only actuated in advance relative to the advancement of the nozzle but has the reference of the tangent to the displacement vector (ΔV/ΔH), while it occurs in a more complex manner if such side is curvilinear, in any case, solvable with mathematical algorithms or by using a camera which outputs matrix information.

Alternatively, the position of the real margin of the glass pane may be acquired in a station upstream of the spacer profile extrusion machine 7 provided with a scanner. This solution has two important advantages and a minor disadvantage.

The first advantage is that it is also possible to scan the glass pane on which the spacer profile 7 is not applied but which is intended to be coupled with the spacer frame 7 to constitute the insulating glass chamber 1, so that the axis H, V, ϑ is not fully compensated, but to combine the signal of the sensor 308 or the sensors 308, 308' with the information acquired by the scanner to deposit the spacer profile in an interpolated position because the glass panes 2 which face the spacer frame 7 itself may not have the same shape errors but may be slightly different or worse the shape errors may be developed in the opposite direction.

The second advantage concerns the elimination of the complicated mechanisms for the placement of the sensor 308 or the sensors 308, 308' and the management of the signals thereof.

The disadvantage, that is really negligible, consists in that the effect of the irregularities that the conveyors of the assemblies 100 and 100', actuating axis H, can induce on the positioning of the margins of the glass panes 2, which would instead actuate the feedback of sensor 308, is no longer filtered out. Such a disadvantage may be considered irrelevant because nowadays the conveyors are built with very reliable mechatronic components.

As a further alternative, the position at which the spacer profile is to be applied can be processed by the controller 306 from the signals or deriving from the sensors 308, 308', 309 or from the information deriving from the scanner according to algorithms which combine the needs of homogeneity of the parameter p with the aesthetic requirements of alignment of the spacer frame with the fixture or alignment between spacer frames belonging to the same multi-chamber insulating glass or in the case of excessively discordant geometries of the glass panes in the same insulating glass.

The linear equation: $v*w*h=c*S$; where v is the relative speed nozzle (301)/glass pane, w is the width of the spacer profile, h is the thickness of the spacer profile, c is the speed of the syringe and S is the area of its section, governs the extrusion process of the thermoplastic product, the extrados of which should be positioned at a constant distance p from the margin of the glass panes to uniform the depth p of the secondary sealant 9 for performing its important functions.

In detail and with reference to FIG. 7, with regard to the logic and power controls used to implement the delivery of the thermoplastic product to the nozzle 301, to obtain the spacer profile they are managed by the PLC 304, and the main INPUTS and OUTPUTS are:

Inputs:
the aforesaid v, w, h
signals from the pressure transducers
feedback from the synchronous motor 408

Outputs:
signals to the drives (not shown in the figure) of the synchronous motor 408, such as to implement the aforesaid equation $v*w*h=c*S$
Such parameters can also be exchanged via operator interface 305.
Other parameters reside in the PLC, e.g. such as the section S of the syringe, transmission ratios, etc., because they are constant data.

In detail and with reference to FIG. 8, with regard to the chasing of the position of the actual margin of the glass pane, one or more sensor(s)/feelers 308, 308' anticipate, in the direction of the relative movement (according to axes H, V, ϑ) the nozzle 301 to identify, by feeling, such position and transfer the information to the PLC 306 which processes the logic and power controls used for managing the axes H, V, ϑ, so that such axes in single or interpolation respectively implement the correction for the positioning of the extrados of the spacer profile 7 at the distance p from the actual margin of the glass pane. The sensor/feeler function can alternatively be implemented by cameras or other electronic devices placed upstream of the nozzle 301.

The function of the sensors/feelers 308, 308' (at least two to be able to detect with further advance also the position of the next side which has an angular offset with respect to the side concerned by the profile extrusion process) or of the camera 309 or another device, may be bypassed if, for the purposes of the final destination of the insulating glass 1, the exact geometry of the spacer profile takes precedence over the constancy of the parameter p relating to the distance from the margin of the glass pane. Indeed, such are the situations in which an absolute alignment is desired of the inner extrados of the spacer frame 7 with the inner margin of the fixture or in which an absolute alignment of the extrados of the spacer frames 7, 7', 7" is desired in the case of insulating glass with multiple chambers, if the geometry of the glass panes 2, 2', 2", 2''' is excessively irregular with respect to the theoretical geometry, however with the consequence, by privileging the aforesaid alignments, of not achieving the functionally more important objective of the constancy of the distance p between extrados of the spacer frame and margins of the glass panes 2, 2', 2", 2'''.

Respectively, the main INPUTS and OUTPUTS are the following:

Inputs:
signals of the sensors/feelers 308', 308' or of the camera 309
feedback from synchronous motors Outputs:
signals to the drives of the synchronous motor for managing the synchronous motors for managing axes H, V, ϑ

These and other parameters can be exchanged via the operator interface.

The operator interfaces from PLC 304 for parameters v, w, h, and from PLC 306 for parameter p are specified in sections 305 and 307 of the control console 12, respectively.

For the good quality of the perimeter joint between the glass pane and the spacer frame, in addition to the constancy of parameter p, the correct laying of the spacer profile according to the transverse direction Z is also very important because the geometry of its section and the initial bonding of the spacer profile—glass pane (before pressing) depend on the transverse positioning of the nozzle 301 and the thrust thereof, applied through the extruded material, towards the peripheral face of the glass pane.

It is known that the glass panes, as presented globally according to the three directions on pages 12 and 13, of which the first two have been examined in the previous paragraphs and the innovative remedies have been exposed, are regretfully not flat mainly for the following types of glass panes: tempered, laminated, screen-printed, combinations of these types.

So, again in view of the good quality of the perimeter joint between the glass panes and the spacer frame 7 (but also of the spacer frame 5), the present invention identifies the solution, original for this specific application, of controlling the approach of nozzle 301 towards the glass pane, irregular according to the transversal axis Z, both in position (first kind of mechanisms) and in force (second kind of mechanisms). This is achieved through an assembly of mechatronic components, those of the 500 series, partly dedicated to position control according to axis Z, partly dedicated to thrust control according to axis Z' coaxial with axis Z.

For tracking of the non-planarity of the glass pane, by means of the first kind of mechanisms, a sensor 511 (shown in FIG. 9 in its scanning function of the face of the glass pane) communicates the real position of the face of the glass pane to PLC 310 and the synchronous motor 501 is activated in feedback through the mechanics 502, 503, 504, 507, 508a, 508b, 509a, 509b (shown in FIG. 10) moves the extrusion head 300 towards and from the face of the glass pane on the guides 509a, 509b belonging to the plate 201 of the vertical carriage 200.

For controlling the thrust of the nozzle 301 against the face of the glass pane, by means of the second kind of mechanisms, taking advantage of the fact that the extrusion head 300 slides on the guides 509a, 509b belonging to the plate 201 and that by the action of gravity the axis Z is sloping with respect to the plane tangent to the Earth's circumference, such extrusion head weighs as a component of its weight towards the face of the glass pane; such control is implemented by the components: pneumatic cylinder 505 (which actuates the fine and soft adjustment of the nozzle position 301, while the sensor 511 actuates the coarse and rigid adjustment), joint 506, linear transducer 510.

The slide 507 and blank 504 are not solid but instead are connected by means of the pneumatic cylinder 505 and the respective connecting rod 506.

The operating principle consists in using the pneumatic pressure at the negative stroke chamber of the pneumatic cylinder to reduce the thrust of the extrusion nozzle 301 towards the face of the glass pane if such thrust is excessive, or in using the pneumatic pressure at the positive stroke chamber of the pneumatic cylinder to increase the thrust of the extrusion nozzle 301 towards the face of the glass pane if such thrust is insufficient. The linear transducer 510 has the function of preventing the piston of the pneumatic cylinder 505 from reaching the end of the stroke, by making the synchronous motor 501 trip for the new coarse but centered positioning according to axis Z. The positioning of the extrusion head 300 according to the axis Z as a function of the sensor signal 511 does not have sufficient reliability, the accuracy deriving from the resolution of the sensor signal 511, the control of the drives, the accuracy of the mechanical processes, the clearances, the temperature, etc., a resolution not better than ±0.5 mm is achieved, which implies that, in case of detachment of the nozzle 301 from the face of the glass pane, a non-definition of the section of the spacer profile in extrusion, a non-contact of the product with the face of the glass pane and a leakage of the product towards the face itself with respective fouling, in case of interference between the nozzle 301 and the face of the glass pane, damage to the latter. It is needless to say that the pneumatic cylinder 505 may be replaced by an equivalent or alternative actuator.

To clarify further, the operation of the second set of mechanisms is as follows.

The body 504, to which the ball nut 503 is constrained, is not rigidly attached to the slide 507 but interfaced with it through an elastic connection consisting of the pneumatic "compensating" cylinder 505 the stem 506 of which is screwed and locked onto a part of the slide 507. It is needless to say, therefore, that as a function of the pressures which can be established in the pneumatic cylinder 505, both in the negative stroke chamber and in the positive stroke chamber, the sealing head 300 and with it the portion of the extrusion nozzle 301 approaching against the face of the glass pane can apply a "soft" or adequate thrust against the face of the glass pane.

The component 510 shown in FIG. 10 consists of a potentiometer which detects the position of the piston inside the pneumatic cylinder 505 and provides feedback to the controller (PLC) 310 so that, by driving the actuator 501, a position of the pneumatic cylinder 505 with respect to the piston contained inside it is restored rather centered, so that there is a working range for the "soft damping" of the nozzle 301 towards the face of the glass pane. Otherwise, there is a risk that the piston reaching the limit stop the nozzle 301 presses excessively against the face of the glass pane, and reaching the positive limit stop the nozzle 301 detaches from the face of the glass pane.

The possibility of placing the aforesaid mechanisms in double feedback is also named and claimed, instead of as described in the preferred embodiment of the invention between body 201 of the vertical carriage 200 moving according to vertical axis V and slide 507 moving according to the transverse axis Z, rather near the end part of the extrusion head 300 immediately upstream of the nozzle 301 to theoretically obtain freer movements because they involve smaller masses and currents on miniaturized slides and thus reduced friction. Such solution, however, is biased by the disturbance introduced by the product feeding pipe which, although flexible, involves additional also variable loads as a function of the flow rate of the product towards the nozzle 301.

Respectively, the main INPUTS and OUTPUTS for managing such double feedback mechanisms are:
Inputs:
  signal of sensor 511
  signal of potentiometer 510
Outputs:
  signal towards the drives of the synchronous motor 501
  signal towards the control valves of the pneumatic cylinder 505 for maintaining the contact force F These and other parameters, in particular, the force F with which it is desired that the nozzle 301 acts against the face of the glass pane, are exchanged through the operator interface 311.

Such control of the force F is important because the extrusion behavior of the product also depends on the viscosity of the product and the viscosity also depends on the temperature, and the product flow from the nozzle 301 is a fluid-dynamic regime which moves the mouth of the nozzle 301 away (FIG. 6 shows this situation at the contour). The possibility of selecting the value F from the operator interface 311 and its effective control operated by the PLC 310 are, therefore, functional to achieving a profile having a homogeneous section and thrust suited for the first constraint towards the glass pane, i.e. the constraint which must start the reaction with the micro-roughness of the glass and effectively support the formed frame until the coupling and pressing phase described above in the production cycle of insulating glass 1.

A further expedient, already in the prior art, is to install the dispensing assembly on the carriage 200, to work with lower product pressures in the circuits, the solution shown in FIGS. 2 and 4, so that the path of the product to be fed to the nozzle 301 is as short as possible, moreover the same path including, in the case of possible future two-component product, a static mixer which implies a pressure drop caused by the energy required for mixing.

The logic and power controls used for the operation of the machine in the problem of the prior art to be solved as a whole and the solution thereof, are all summarized in FIGS. 7, 8, 9 and 11 where the main INPUTS and OUTPUTS to the controllers 304, 306, 310 are indicated, and precisely:
Inputs:
  w=width of the spacer profile
  h=thickness of the spacer profile
  v=relative speed at periphery of the pane of glass/extrusion nozzle 301
  p=distance from extrados of the profile to margin of the glass pane
  signals from the sensor 308, 308', 309, 511, 510
  signals from the pressure transducer 410
  feedback from synchronous motors driving the axes: H, H', H", V, $\vartheta$, K, K', Z, Z'
Outputs:
  drives towards synchronous motors, such to implement the equation $v*w*h*=c \times S$, also and particularly in the transients steps related to changes of direction of the spacer profile, where v is the ramp variable, and of the execution of the butt joint of the spacer profile, where v and w are ramp variables.

Other parameters reside in the controllers, such as the section S of the syringe or the transmission ratios of the various kinematic mechanisms, because they are fixed data.

Such description refers to the case, unique in the current prior art, in which the product to be extruded is a single component.

Indeed, the product used to manufacture such spacer frame is generally a single-component product and is hot extruded, being a thermoplastic product, so that the dispenser 400 shown in FIGS. 5A, 5B and conduction circuits to the extrusion nozzle 301 and the extrusion nozzle 301 shown in FIGS. 6 to 11 are heat-controlled, as are the storage drums of the product with respective pressure plates, pumps and transfer circuits (typically there are two drums because when one finishes the other is already preheated and ready to switch to the dispensing assembly 400).

However, other types of products are not excluded, whether single-component or two-component, which may constitute the spacer profile, should developments in technology make them available in the future and which are still adapted to be used in the device described and claimed here.

The possibility of there being two-component products for executing the spacer frame would be covered by patent application U.S. Ser. No. 15/668,443 by the same owner and by Italian patent application 102016000082108 of 4 Aug. 2016, also of the same owner, which is a well-known technique, relating to "relay dispensers" for the perimeter sealing of insulating glass, in which the sealants are prevalently two-component (base+catalyst).

The profile extruded against the glass pane has a generally rectangular cross-section of area A=w*h, the sides w and h of which are respectively defined by the action of the shutter 303 (either by adjustment or control) and the shape of the outlet mouth of the nozzle 301.

Generally, h is kept constant (or changes discontinuously by replacing the extrusion nozzle assembly 301 and w is varied as a function of the composition of the insulating glass 1, with the possibility of continuous selection by means of the adjustment of the shutter 303 of the nozzle 301, normally obtained by means of an actuator the position of which is feedback-controlled (axis K').

The present invention is susceptible to numerous variations (with respect to what can be inferred from the drawings, details of which are apparent and eloquent) all falling within the scope of equivalence with the inventive concept, e.g. such as: the mechanical solutions for the displacement motions of the dispensing syringes, the driving means which may be electric, electric-electronic, pneumatic, hydrodynamic and/or combined, etc., the control means which may be electronic or fluidic and/or combined, etc.

A variant of the known part of the invention and, in turn, not inventive, however residing practically in the software alone and therefore using the same devices described above for the rectangular glass panes 2 exposed hereto is the logical combination of synchronous drives, respectively: of horizontal translation according to the axes H, H' of the glass pane 2 by means of synchronous motors; of vertical translation according to the axis V of the head 200 by means of synchronous motor; of rotation according to the axis 9 of the head 300 by means of synchronous motor; of control, in adjustment or control, of the shutter 303 of the nozzle 301 to allow the extrusion process of the spacer profile 7 and the forming of the spacer frame on a glass pane 2*l* having a shape different from rectangular because it is regular or irregular polygonal or on a glass pane 2*r* having a different shape from rectangular because it is curvilinear or on a glass pane 2*lr* having a different shape from rectangular because it contains both straight and curvilinear parts.

The troubleshooting of the described drawbacks of the prior art is further refined through precise positioning of the glass panes 2, 2', 2", 2''', etc., 2*l*, 2*r*, 2*lr* so that the position p also constitutes the initial "set point". To do this, the device in FIG. 15 allows the glass pane to be stopped in the following sequence (see FIG. 15):

the carriage 100" moves according to the axis H", parallel to the axes H and H', actuated by a synchronous motor 101", and is positioned in a field in which it is desired to stop a reference of the glass pane 2, 2', 2", 2''', etc., 2*l*, 2*r*, 2*lr*, e.g. the tail 2*c*, to achieve a precise start of the formation of the spacer frame 7, 7', 7", etc., 5, 5', 5", etc. at the position p relative to the margin of the glass pane.

Such carriage carries an arm 102", with movement for protruding or retracting relative to the sliding plane 900 in the direction, and such arm bears: sensors 103", 104" for actuating the decelerations of the axes H and H' and plate 105" equipped with a microswitch 106" to actuate the precise stopping of the glass pane.

The construction details referred to in the description of a preferred mode of execution of the invention are equivalent.

The materials and dimensions can be any depending on the requirements, in particular, deriving from the dimensions (base and height) and/or the shape of the glass panes 2, 2', 2", 2''', 2M, 2'*m*, 2"*m* that will form insulating glass 1 once the spacer profile 7 has been extruded to form the spacer frame and a second pane has been coupled and possibly further spacer frames and glass panes have been coupled.

INDUSTRIAL APPLICATION

It is needless to say that the industrial application is certainly successful because the lines of machines for the production of insulating glass 1 have developed particularly well over the last twenty years.

All the more so, the size of the peripheral spacer profile, in terms of the area of its section, and the extension of the perimeter of insulating glass 1, in terms of length, all of which have increased substantially due to the architectural developments related to insulating glass.

Indeed, today the type of insulating glass has undergone a surprising increase in quantity and size; suffice it to mention structural glazing that extends for heights of more than one story or commercial glazing which reaches lengths of more than 18 meters and that the large surface dimensions require the use of glass panes and spacer frame thicknesses which are equally large.

This requires that the peripheral joint between spacer frames and glass panes is carried out in a workmanlike manner, in particular by obtaining a rather homogeneous distance p between the extrados of the spacer frames and the margin of the glass panes.

But the automatic lines of the prior art have proven to be either unsuitable for such parallel development of the final product, or capable of only partially solving the issues. Furthermore, leading manufacturers have developed the technology of forming the spacer frame 7 by extrusion directly against the face of the glass pane, as described in this application, and neither considered the priority requirements of edge quality for the validity of the joint in terms of the effectiveness of the functions performed by the primary and secondary sealants, compared to the aesthetic appearance, that however important can be sacrificed slightly.

The insertion of the present invention in the insulating glass production line is shown in FIGS. 13 and 14 (elevation and plan view) with reference numeral 1000.

Naturally, the invention thus described is susceptible to many changes and variants, all comprised within the scope of the inventive concept.

The invention claimed is:

1. A device for the extrusion and application of a spacer profile of insulating glass, comprising at least one feeler located upstream of an extrusion nozzle that identifies a position of a margin of a glass pane and transmits a position signal to a controller which, through axes H, V, ϑ, driven by synchronous motors, actuates a keeping of a mutual position of the nozzle and margin of the glass pane at a distance p which is set through an operator interface.

2. A device according to claim 1, wherein, for a curvilinear shape 2r and a polygonal shape with one or more curvilinear sides 2lr of the glass pane, the position of the margin of the glass pane is identified by a camera or by another optical device located upstream of the extrusion nozzle.

3. A device according to claim 1, wherein the position of the margin of the glass pane is identified upstream by a scanner and transmitted to the controller.

4. A device according to claim 1, wherein the position of the margin of the glass pane is processed by the controller according to algorithms which combine needs of homogeneity of the distance p with aesthetic requirements of alignment of the spacer frame with alignment between spacer frames.

5. A device according to claim 1, wherein the spacer profile is composed by a flexible foamed synthetic material.

6. A device according to claim 1, wherein a zero position of the glass pane against which either the extrusion of the spacer profile or an application of the spacer profile starts is obtained by using a carriage moving along an axis H", parallel to the axis H and to an axis H', actuated by a synchronous motor which is positioned in a field in which it is desired to stop a reference of the glass pane to achieve a precise start of formation of a spacer frame at a position p relative to the margin of the glass pane, such carriage carrying an arm, with movement for either protruding or retracting with respect to a sliding plane along a direction Z, such arm carrying: sensors for actuating decelerations of the axes H and H' and a plate provided with a microswitch for actuating a precise stop of the glass pane.

7. A device according to claim 6, wherein the zero position of the glass pane is obtained through the carriage moving along the axis H", parallel to the axes H and H', actuated by the synchronous motor and carrying a mechanical system consisting of an idle roller, pushed by a spring, slidably mounted on a guide of a supporting arm, with movement for either protruding or retracting relative to the sliding plane along the direction Z, a wheel-arm relative position being measured by a potentiometer, a signal of which activates a stop of the axes H and H', such carriage positioning itself so that a field of action of the potentiometer falls in a position to stop a reference of the glass pane with accuracy.

8. A device for the extrusion and application of a spacer profile of insulating glass wherein an extrusion nozzle, through mechanisms comprising: an actuator; a mechanical transmission; a support; an actuator/compensator; a connection to slide; and a transducer, all located in a synchronous carriage; a sensor, located in an extrusion head, interfaced with one another and operating in connection with an ubication of a perimeter face of a glass pane, during a relative movement of the nozzle, the extrusion nozzle following an actual position, not a theoretical position, of such face along a transverse axis Z, with control of force applied by the nozzle against the face of the glass pane in perimeter portions in which the pane receives the extrusion of the spacer profile.

9. A procedure for the extrusion and application of a spacer profile of insulating glass, comprising keeping a mutual position of a nozzle and margin of a glass plate at a constant distance p, which is set through an operator interface, chasing an actual position of the margin of the glass pane, which may be different from a theoretical geometric position, so that a peripheral cavity identified by inner faces of the glass pane and a spacer profile is homogeneous along a complete perimeter of the insulating glass, and filling with a secondary sealant performing structural bonding and gas and water vapor tightness functions.

10. The procedure of claim 9, wherein a position and thrust force towards the face of the glass pane of the nozzle is controlled, along a transversal axis Z, throughout an entire extrusion path of the spacer profile.

11. A procedure according to claim 9, wherein the spacer profile is a flexible foamed synthetic material.

12. A procedure according to claim 11, wherein a position and thrust force towards the face of the glass pane of a guiding and laying tool of the spacer profile is controlled, according to the transversal axis Z, throughout an entire application path of the spacer profile.

* * * * *